US010313446B2

(12) United States Patent
Liu et al.

(10) Patent No.: US 10,313,446 B2
(45) Date of Patent: Jun. 4, 2019

(54) SYSTEM AND METHOD FOR FIRE GROUND ENTRY CONTROL BASED ON INTERNET OF THINGS

(71) Applicant: SICHUAN REX SMART TECHNOLOGY CORPORATION LIMITED, Sichuan (CN)

(72) Inventors: Yang Liu, Sichuan (CN); Chenglie Feng, Sichuan (CN); Hua Yang, Sichuan (CN)

(73) Assignee: SICHUAN REX SMART TECHNOLOGY CORPORATION LIMITED, Sichuan (CN)

( * ) Notice: Subject to any disclaimer, the term of this patent is extended or adjusted under 35 U.S.C. 154(b) by 0 days.

(21) Appl. No.: 15/716,522

(22) Filed: Sep. 27, 2017

(65) Prior Publication Data

US 2018/0183875 A1 Jun. 28, 2018

(30) Foreign Application Priority Data

Dec. 27, 2016 (CN) .......................... 2016 1 1224925

(51) Int. Cl.
| H04L 29/08 | (2006.01) |
| H04W 84/18 | (2009.01) |
| A62C 99/00 | (2010.01) |
| H04W 88/16 | (2009.01) |
| H04W 4/70 | (2018.01) |
| H04W 4/90 | (2018.01) |
| H04W 4/00 | (2018.01) |

(52) U.S. Cl.
CPC ............ *H04L 67/12* (2013.01); *A62C 99/009* (2013.01); *H04W 4/70* (2018.02); *H04W 4/90* (2018.02); *H04W 84/18* (2013.01); *H04W 88/16* (2013.01)

(58) Field of Classification Search
CPC ........ H04L 67/12; H04W 4/70; H04W 84/18; H04W 88/16; H04W 4/90; H04W 76/50; A62C 99/009
USPC .......................................................... 340/3.1
See application file for complete search history.

(56) References Cited

U.S. PATENT DOCUMENTS

| 2008/0007396 A1* | 1/2008 | Parkulo | ................ G01S 13/878 340/539.2 |
| 2009/0174547 A1* | 7/2009 | Greene | ................ A62B 99/00 340/539.13 |
| 2011/0276264 A1* | 11/2011 | Plocher | ................ G01C 21/20 701/533 |

(Continued)

*Primary Examiner* — Edwin C Holloway, III
(74) *Attorney, Agent, or Firm* — JCIPRNET (57) ABSTRACT

A system and a method for fire ground entry control based on internet of things are provided. The system includes a fire ground entry Node subsystem, a fire ground entry LoRa Gateway&Server subsystem and a monitoring and controlling subsystem, where the fire ground entry Node subsystem includes multiple LoRa Node terminals, each user entering a fire ground is equipped with a LoRa Node terminal, and each LoRa Node terminal includes a LoRa antenna and a Wi-Fi antenna; the fire ground entry LoRa Gateway&Server subsystem includes a LoRa Gateway chip, a LoRa Server chip, a LoRa antenna, a Wi-Fi antenna and a battery pack, and the LoRa Gateway chip and the LoRa Server chip are integrated into a whole body; and the monitoring and controlling subsystem monitors the fire ground entry Node subsystem and the fire ground entry LoRa Gateway&Server subsystem.

20 Claims, 2 Drawing Sheets (56) References Cited

U.S. PATENT DOCUMENTS

| | | | |
|---|---|---|---|
| 2012/0264394 A1* | 10/2012 | Miller | G06Q 10/06 |
| | | | 455/404.1 |
| 2015/0077282 A1* | 3/2015 | Mohamadi | G01S 7/415 |
| | | | 342/27 |
| 2016/0323886 A1* | 11/2016 | Luna, Jr. | H04W 52/265 |
| 2017/0180929 A1* | 6/2017 | Cavendish | H04W 4/021 |
| 2017/0373790 A1* | 12/2017 | Curtis | H04L 1/0006 |
| 2018/0062873 A1* | 3/2018 | Chiang | H04W 4/70 |

* cited by examiner

SYSTEM AND METHOD FOR FIRE GROUND ENTRY CONTROL BASED ON INTERNET OF THINGS

CROSS-REFERENCE TO RELATED APPLICATION

This application claims the priority benefit of China application serial no. 201611224925.X, filed on Dec. 27, 2016. The entirety of the above-mentioned patent application is hereby incorporated by reference herein and made a part of this specification.

BACKGROUND OF THE INVENTION

Field of the Invention

The present disclosure relates to the field of intelligent fire rescue, and particularly relates to a method for fire ground entry control based on internet of things.

Description of Related Art

Low-Power Wide-Area Network (LPWAN)

Currently, low-power wide-area network (LPWAN) as a new developing hotspot in the field of internet of things is very suitable for performing large-scale deployment of the internet of things due to its characteristics of low power and wide area. More and more LPWAN applications will emerge in the Made in China 2025 and Smart City construction and development processes. Specifically, the LPWAN may be described from the following aspects.

Short range and long range: the common short range wireless communication technology, e.g., Wi-Fi, Bluetooth and the like, generally has a communication range within tens of meters, so that a network covering one region or one city by utilizing such technology will need relatively higher deployment costs. However, the LPWAN has a wireless communication range within a few kilometers, even tens of kilometers, so, due to the LPWAN, the wireless communication range is increased, a new development space is brought to application of the internet of things, a defect of the wireless communication range of the internet of things is compensated, and technical supports are provided for the deployment of large-scale applications of the internet of things.

High data rate and low data rate: in one aspect, applications, e.g., on-line web page and video browsing on a computer or a mobile phone, pursue an as-high-as-possible data rate; in the other aspect, a few applications, e.g., meter reading and the like, of the internet of things do not need the as-high-as-possible data rate, but need a low communication frequency and a very small volume of transmitted data.

Power supply and low power: a high data rate corresponds to a high power and needs a sufficient power supply; however, the LPWAN has a low data rate, and its end nodes only need a little electric energy to work, so that the end nodes can be powered by batteries or other energy harvesting modes, which facilitates that the end nodes can access a network on a large scale in a certain range.

Public network and Private network: compared with country-wide networks of telecommunication network operators, the LPWAN is growing. The telecommunication network operators have mature commercial modes, but the LPWAN does not have an existing commercial mode for reference and needs to be continuously explored and innovated. Compared with the networks of the telecommunication network operators, the LPWAN has very lower construction costs, where a small operation network can be built up by using a relatively lower investment in order to perform commercial operations of a few projects, but a network covering one city, even one country, cannot be built up in a large area without participation and support of the telecommunication network operators (such as China Tower Corporation). If a telecommunication network is called as a "public network", a commercially operated LPWAN can be called as a "private network" or a "small network" which is independently commercially operated in a small range, and in the future, "private network" operators will appear.

LoRa® Technology and LoRaWAN™

LoRa means "long range", which is a low-power long-range wireless communication technology, mainly faces to applications of internet of things (IoT) or M2M and is an important wireless technology of the LPWAN.

Long range: LoRa® base stations or gateways have relatively stronger penetrability under a dense urban environment and in the city, and a communication range of sensors in an open suburban area may be up to 15-30 km, even farther.

Low cost: the LoRa® has low infrastructure and operation costs, and its terminal node sensors also have low costs.

Standardization: LoRaWAN™ ensures interoperability among applications and facilitates utilization and deployment by internet of things solution providers and telecommunication network operators.

Low power: the LoRaWAN™ protocol is specially developed for low power, and its utilized battery has a service life for many years.

The LoRaWAN™ belongs to an LPWAN specification and is applied to battery-powered wireless devices in a local area network, a national network or a global network. The LoRaWAN™ with the purpose of key requirements of the internet of things, e.g., safe both-way communication, mobile services and local services, provides seamless interoperability among intelligent devices without the need for complex local installation, sets users, developers, corporations free, and plays a part in the internet of things.

A network structure of the LoRaWAN™ generally is arranged to be a star topology structure, where a gateway is a transparent bridge for forwarding data between a terminal device and a background central network server. All gateways and the network server are connected through the standard IP protocol, but each terminal device singly hops into one or more gateways through wireless communication; and all of the terminal nodes generally are in both-way communication, and still support multicast operations to implement over-the-air (OTA) software update or other massive information distribution in order to shorten the air communication time.

The terminal devices and the gateways are communicated in different channels at different data rates. A selection of the data rates needs to weigh a communication range and a communication delay. Due to the spread spectrum technology, communication at different data rates is not interfered with each other, and a group of "virtual" channels will be created, thereby increasing the gateway capacity. Furthermore, the LoRaWAN™ has a data rate range from 0.3 kbps to 50 kbps.

A LoRaWAN™ network server respectively manages data for each terminal device and each RF output by an adaptive data rate (ADR) method in order to prolong a battery life of each terminal device and increase an integral network capacity to the utmost extent.

For a countrywide network of the internet of things, important infrastructures, private personal data or important social functions with special requirements on security communication have been protected through multi-level encryption.

It is predicted that the LPWAN will support a major part of predicted billions of devices of the internet of things, and the LoRaWAN™ protocol is designed from bottom to top and optimizes the LPWAN in the aspects of battery life, capacity, range and costs.

The LoRa® is a physical layer or wireless modulation for establishing a long range communication link. Multiple traditional wireless systems use frequency-shift keying (FSK) modulation as the physical layer due to the FSK modulation with high efficiency in an aspect of implementation of the low power. The LoRa® utilizes a chirp spread spectrum modulation technology, which keeps the same low-power characteristic with the FSK modulation, but obviously increases the communication range. The chirp spread spectrum modulation technology can implement a long communication range and interference robustness so as to have been used for decades in the fields of military and space communication, but it is the first time that the LoRa® is used for a commercial purpose at low costs.

The LoRa® has a huge advantage of a long range capability, where a single gateway or base station can cover a whole city or hundreds of kilometers. At a given position, a coverage range depends on the environment or barriers to a large extent, but the LoRa® and the LoRaWAN™ have a link budget which is better than any other standardized communication technologies, where the link budget which is generally expressed by decibels (with the unit of db) is a main factor for deciding the coverage range under the given environment.

The LoRaWAN™ defines a communication protocol and system architecture of a network, but the LoRa® physical layer can make a long range communication link possible. The protocol and the network architecture have most influence to node battery life, network capacity, service quality, security, quality of service of various network applications and the like.

Most of currently deployed networks utilize mesh network architecture. In a mesh network, an individual terminal node forwards information of other nodes in order to increase the network communication range and the scale of a network area. Although the network communication range is enlarged, the complexity is also increased, the network capacity is reduced, and the battery life is shortened, because the node receives and forwards possibly unassociated information from other nodes. When long range communication is implemented, it is most important that the battery life is protected by a long-range star architecture.

In the LoRaWAN™ network, a node is unassociated with a special gateway; on the contrary, data transmitted by one node generally is received by multiple gateways, where each gateway forwards data packets received from the terminal node to a network server based on cloud computing through a few backhauls (LTE, Ethernet, satellite or Wi-Fi). Therefore, a server is endowed with intelligence and complexity, and the server manages the network and filters received redundant data, performs security check, performs scheduling acknowledge through an optimal gateway, performs an adaptive data rate and the like. If one node is movable or moving, no switching from a gateway to another gateway is needed, which is an important function and can be applied to asset tracking.

Wireless technologies in applications of the internet of things, except for 2G/3G/4G of a communication network, include the local area network and various short range communication technologies, such as Wi-Fi within a 2.4 G frequency band, Bluetooth, Zigbee, Sub-Ghz and the like. Such short range communication technologies have very obvious advantages and disadvantages. The wireless application development and engineering operation-maintenance persons always have such a dilemma that the designers can only choose one from longer range and lower power. However, after the LoRa technology is utilized, the designers can take into account both of the longer range and the lower power, and they can implement the both to the utmost extent and additionally save relay costs at the same time.

In recent years, the LoRa as a long range communication technology of the LPWAN has been paid more and more attention. As development of the internet of things from a short range to a long range, a few of new industrial applications and business modes will generate. LoRa alliance members, including Cisco, IBM, Semtech, Microchip and the like, are actively promoting the LoRa technology, ST and Semtech have cooperated, and they will launch LoRa-based reference designs and provide more products and design resources for LoRa developers in order to help the LoRa developers to perform design and development of the internet of things based on the LoRa technology.

A fire ground entry system needs to in real time transmit a temperature nearby a fire fighter and a pressure of compressed air carried by the fire fighter to an on-site rescue fire ground commander, and according to site situations, the commander can perform voice communication and transmit commands through a wireless interphone after obtaining firsthand data.

The fire ground entry system needs to be capable of transmitting abnormal states of the fire fighter and other information to the on-site fire ground commander, and meanwhile, the on-site fire ground commander also needs to be able to timely transmit an evacuation command and use sounds and optical indicating lamp information to notify the fire fighter of evacuation.

However, situations of the fire ground are complex in general, and under some specific conditions, wireless voice communication is unavailable, but the LoRa shows an outstanding and incomparable deep coverage capability.

SUMMARY OF THE INVENTION

Deployment of LoRa internet of things applications needs a relatively higher technological base, and particularly design of a stable and reliable product system for the LoRaWAN protocol still has a certain technological threshold. To reduce the foundation construction workload of LoRa developers and accelerate the design and deployment of an internet-of-things system, the present disclosure provides a LoRa-based extra-fast internet of things platform solution. Specifically, a system and a method for fire ground entry control based on internet of things are provided.

The system for fire ground entry control based on internet of things includes a fire ground entry Node subsystem, a fire ground entry LoRa Gateway&Server subsystem and a monitoring and controlling subsystem;

the fire ground entry Node subsystem includes multiple LoRa Node terminals, each user entering a fire ground is equipped with a LoRa Node terminal, and each LoRa Node terminal includes a LoRa antenna and a Wi-Fi antenna;

the fire ground entry LoRa Gateway&Server subsystem includes a LoRa Gateway chip, a LoRa Server chip, a LoRa antenna, a Wi-Fi antenna and a battery pack, and the LoRa Gateway chip and the LoRa Server chip are integrated into a whole body; and the monitoring and controlling subsystem is used for monitoring the fire ground entry Node subsystem and the fire ground entry LoRa Gateway&Server subsystem;

the LoRa Node terminals are connected through LoRa;

each LoRa Node terminal in the fire ground entry Node subsystem is wirelessly connected with the fire ground entry LoRa Gateway&Server subsystem through a LoRaWAN network;

each LoRa Node terminal in the fire ground entry Node subsystem is wirelessly connected with the monitoring and controlling subsystem through Wi-Fi and/or COFDM; and the fire ground entry LoRa Gateway&Server subsystem is wirelessly connected with the monitoring and controlling subsystem through Wi-Fi and/or COFDM.

Optionally, the LoRa Node terminal includes the following functional modules:

a video collection module, including an infrared camera and a visible-light camera;

a fire ground environment detection module, including a temperature sensor, a humidity sensor, an air pressure sensor, an air component sensor and a wind speed sensor, where the air component sensor can monitor concentrations of petroleum gas, methane, carbon monoxide and carbon dioxide;

a vital sign detection module, including a shell temperature sensor, a heart rate sensor, a blood pressure sensor and a respiration sensor;

an A/D conversion module, used for converting analogue signals collected by each sensor in the fire ground environment detection module and the vital sign detection module into digital signals;

a navigation and location module, including an inertial navigation and location unit and a satellite navigation and location unit, where the satellite navigation and location unit includes a GPS location subunit and a Beidou location subunit, the satellite navigation and location unit is used for performing navigation and location when a satellite navigation and location signal is relatively stronger, and the inertial navigation and location unit is used for performing the navigation and location when the satellite navigation and location signal is relatively weaker or does not exist;

a wireless communication module, including the LoRa antenna and the Wi-Fi antenna;

an electronic map receiving module, used for, before a user enters the fire ground, downloading a fire ground building electronic map from the fire ground entry LoRa Gateway&Server subsystem through a LoRaWAN network or downloading the fire ground building electronic map from the monitoring and controlling subsystem through a Wi-Fi network;

a preset route generation module, used for generating multiple preset fire ground entry routes according to the downloaded fire ground building electronic map, and recommending an optimal preset route to the user;

a preset route deviation prompting module, used for prompting that a current position of the user is deviated from the preset route when the current position of the user is deviated from the preset route;

an escape route calculation module, used for recalculating a route for the user according to the fire ground building electronic map and the current position of the user when the current position of the user is deviated from the preset route;

a barrier prompting module, used for reading an actual position of the user in real time, and generating a voice prompt for prompting the user about a barrier when the user is close to the barrier in the fire ground building electronic map, where the barrier includes a step, a bend, a stair, a cross beam, an upright, a door, a door frame, a doorsill, a ground bulge, a pit and a hole;

an air cylinder connection module, used for connecting a high-pressure air pipe port of the LoRa Node terminal with an air pipe of a respirator air cylinder, where such connection is fixed by a bolt;

a power-on module, used for powering on the LoRa Node terminal when one of the following conditions is met:
  i) when the LoRa Node terminal is powered off, the user long presses a power button over 3 seconds; and
  ii) when the LoRa Node terminal is powered off, a lasting time of an output pressure larger than 1 MPa of an air cylinder is over 3 seconds after a high-pressure valve of the air cylinder is switched on;

a power-off module, used for powering off the LoRa Node terminal when the LoRa Node terminal is powered on, a displayed pressure value of a pressure gage is smaller than 1 MPa and the user long presses the power button over 3 seconds;

a terminal screen switching module, used for switching a terminal screen between the following two interfaces when the user presses a screen switching button:
  a) an interface only displaying an air cylinder pressure; and
  b) an interface simultaneously displaying the air cylinder pressure, an air cylinder residual respiration time and an environment temperature;

an air cylinder pressure display module, used for displaying an internal pressure value of the air cylinder in real time;

an air cylinder pressure alarming module, used for simultaneously generating an audible alarm and a visual alarm when the air cylinder pressure exceeds a safety range, where the audible alarm is implemented by buzz of a buzzer, and the visual alarm is implemented by flashing of an indicating lamp, the volume of the buzzer is larger than or equal to 90 dB, and the air cylinder pressure is in the safety range if and only if the internal pressure value of the air cylinder is larger than or equal to 1 MPa and smaller than or equal to 6 MPa;

an air cylinder residual air amount and usable time display module, used for dynamically displaying a residual air amount of the air cylinder and a residual usable time of the air cylinder in real time;

a battery low voltage alarming module, used for enabling a battery low voltage indicating lamp to turn yellow and be always on in order to give a battery low voltage alarm prompt when a residual battery capacity of the LoRa Node terminal is smaller than a first battery capacity threshold, where the first battery capacity threshold is in an amount of 20% of the total battery capacity;

a fall-down alarm call module, used for performing an automatic pre-alarm and/or alarm call after the user is in distress and falls down;

an active distress call module, used for performing an active distress call when the user is in distress, where the active distress call module is enabled when the user continuously presses a distress call button over 3 seconds, and the active distress call module is disabled when the user continuously presses the distress calling button over 2 seconds under the condition that the active distress call module is on;

a fire ground environment parameter real-time display module, used for displaying a temperature, humidity, an air pressure, air components, and/or a wind speed of the fire ground environment in real time;

a vital sign parameter real-time display module, used for displaying a shell temperature, a heart rate, a blood pressure, and/or respiration parameters of a user entering the fire ground in real time; and an indicating lamp module, including a group of indicating lamps with difference colors, and used for indicating different states of the LoRa Node terminal, where the group of indicating lamps include:
  a LoRa Node terminal and LoRa Gateway&Server subsystem connection indicating lamp, blue;
  a LoRa Node terminal and monitoring and controlling subsystem connection indicating lamp, green;
  a battery low voltage indicating lamp, yellow;
  a temperature indicating lamp, red;
  an air component indicating lamp, pink;
  an air cylinder and respiratory abnormality indicating lamp, orange;
  a vital sign abnormality indicating lamp, purple;
  a preset route deviation indicating lamp, gray; and
  an alarm indicating lamp, white.

A method for fire ground entry control based on internet of things is applied to the system for fire ground entry control based on internet of things, and each user entering a fire ground is equipped with a LoRa Node terminal. The method sequentially includes the following steps before the user enters the fire ground:

a1) by the user, checking whether the terminal is powered on; and powering on the terminal by utilizing one of the following two modes if the terminal is not powered on:
  i) long pressing a power button over 3 seconds;
  ii) switching on the high-pressure valve of an air cylinder, and automatically powering on the terminal when a lasting time of an output pressure larger than 1 MPa of the air cylinder is over 3 seconds;

a2) detecting whether a LoRa network of the terminal is in normal connection; and transmitting a LoRa network connection abnormality prompt to the monitoring and controlling subsystem if the LoRa network of the terminal is not in normal connection;

a3) detecting whether a Wi-Fi network of the terminal is in normal connection; and transmitting a Wi-Fi network connection abnormality prompt to a fire ground entry LoRa Gateway&Server subsystem if the Wi-Fi network of the terminal is not in normal connection;

a4) detecting whether a high-pressure air pipe port of the terminal is normally connected with an air pipe of a respirator air cylinder; and prompting the user to greatly fix a bolt if the high-pressure air pipe port of the terminal is not normally connected with the air pipe of the respirator air cylinder;

a5) detecting whether the air cylinder needs to be changed; and specifically, changing the air cylinder when one of the following conditions is met:
  i) an air cylinder pressure is out of a safety range;
  ii) an internal residual air amount of the air cylinder is smaller than a preset value; and
  iii) a residual usable time of the air cylinder is smaller than a preset value;

a6) detecting whether a battery voltage of the terminal is lower than a second battery voltage threshold; and prompting the user to charge or change a battery if the battery voltage of the terminal is lower than the second battery voltage threshold, where the second battery voltage threshold is in an amount of 30% of a total capacity of the battery;

a7) detecting whether each indicating lamp in the indicating lamp module normally works; and transmitting an indicating lamp module initialization abnormality prompt to the monitoring and controlling subsystem if each indicating lamp in the indicating lamp module does not normally work;

a8) detecting whether each sensor in the fire ground environment detection module normally works; and transmitting a fire ground environment detection module initialization abnormality prompt to the monitoring and controlling subsystem if each sensor in the fire ground environment detection module does not normally work;

a9) detecting whether each camera in the video collection module normally works; and transmitting a video collection module initialization abnormality prompt to the monitoring and controlling subsystem if each camera in the video collection module does not normally work;

a10) detecting whether each sensor in the vital sign detection module normally works; and transmitting a vital sign detection module initialization abnormality prompt to the monitoring and controlling subsystem if each sensor in the vital sign detection module does not normally work;

a11) detecting whether each navigation and location unit in the navigation and location module normally works; and transmitting a navigation and location module initialization abnormality prompt to the monitoring and controlling subsystem if each navigation and location unit in the navigation and location module does not normally work;

a12) judging whether the fire ground entry LoRa Gateway&Server subsystem saves a fire ground building electronic map; and downloading the fire ground building electronic map through the monitoring and controlling subsystem if the fire ground entry LoRa Gateway&Server subsystem does not save the fire ground building electronic map, and then uploading the fire ground building electronic map to the fire ground entry LoRa Gateway&Server subsystem;

a13) judging whether a transmission rate of a LoRaWAN network between the LoRa Node terminal of the user and the fire ground entry LoRa Gateway&Server subsystem reaches a preset value;

downloading the fire ground building electronic map from the fire ground entry LoRa Gateway&Server subsystem through the LoRaWAN network by the LoRa Node terminal of the user if the transmission rate of the LoRaWAN network between the LoRa Node terminal of the user and the fire ground entry LoRa Gateway&Server subsystem reaches the preset value; and downloading the fire ground building electronic map from the monitoring and controlling subsystem through the Wi-Fi network by the LoRa Node terminal of the user if the transmission rate of the LoRaWAN network between the LoRa Node terminal of the user and the fire ground entry LoRa Gateway&Server subsystem does not reach the preset value; and a14) generating multiple preset fire ground entry routes according to the downloaded fire ground building electronic map, and recommending an optimal preset route to the user.

Optionally, the following operations are performed in real time after the user enters the fire ground:

b1) prompting that a current position of the user is deviated from a preset route if detecting that an actual position of the user is deviated from the preset route; and recalculating a route for the user according to the fire ground building electronic map and the current position of the user;

b2) giving a voice prompt to the user to pay attention to a barrier if detecting that the user is close to the barrier in the fire ground building electronic map, where the barrier includes a step, a bend, a stair, a cross beam, an upright, a door, a door frame, a doorsill, a ground bulge, a pit and a hole b3) activating a pre-alarm state if detecting that the user falls down and a still time of the user is over a maximum still time threshold, and at this point, continuously emitting a "beep" pre-alarm call;

judging whether user movement is detected in a pre-alarm time threshold after the pre-alarm state is activated;

automatically canceling the pre-alarm and stopping the pre-alarm call if the user movement is detected in the pre-alarm time threshold; and switching to an alarm state from the pre-alarm state if the user movement is not detected in the pre-alarm time threshold, and at this point, continuously emitting a "beep" alarm call, where the frequency and decibel of the alarm call are higher than the frequency and decibel of the pre-alarm call;

b4) instructing the user through the indicating lamp module specifically as follows:

turning on a blue indicating lamp if detecting that the LoRa Node terminal is not normally connected with the fire ground entry LoRa Gateway&Server subsystem;

turning on a green indicating lamp if detecting that the LoRa Node terminal is not normally connected with the monitoring and controlling subsystem;

turning on a yellow indicating lamp if detecting that the residual battery capacity of the terminal is lower than a first battery capacity threshold;

turning on a red indicating lamp if detecting that a fire ground environment temperature is over a preset value;

turning on a pink indicating lamp if detecting that a content of each gas in air components of the fire ground is over a preset value;

turning on an orange indicating lamp and making the lamp blink if detecting that the air cylinder is not correctly connected or an air cylinder pressure is out of the safety range;

turning on a purple indicating lamp if detecting that vital sign parameters are abnormal;

turning on a gray indicating lamp if detecting that the user is deviated from the preset route; and  turning on a white indicating lamp if detecting that the user falls down;

b5) storing fire ground video data collected by the video collection module of the terminal into a video data buffer of the terminal; and performing the following operations at every constant time interval or when the video data buffer is full:

b5-1) encoding the fire ground video data stored in the video data buffer;

b5-2) uploading the encoded fire ground video data to the monitoring and controlling subsystem;

b5-3) forwarding the encoded fire ground video data to a database of the fire ground entry LoRa Gateway&Server subsystem by the monitoring and controlling subsystem; and  b5-4) deleting the video data buffer; and performing the following operations when the fire ground entry LoRa Gateway&Server subsystem receives the fire ground video data of the terminal:

b5-1') decoding the received fire ground video data;

b5-2') performing feature extraction on the decoded fire ground video data, thereby obtaining feature data; and  b5-3') judging whether the fire ground building electronic map needs to be updated according to the obtained feature data; and transmitting the updated fire ground building electronic map to the terminal and the monitoring and controlling subsystem if the fire ground building electronic map needs to be updated; and b6) converting analogue signals collected by each sensor in the fire ground environment detection module and the vital sign detection module into digital signals; and triggering the indicating lamp module according to requirements based on the obtained digital signals.

In the present disclosure, the LoRaWAN implements low-rate wireless transmission. However, implementation of high-rate wireless transmission can be realized by various modes, and as a replaceable mode, the Wi-Fi wireless transmission mode in the present disclosure completely can be replaced with the COFDM wireless transmission mode.

BRIEF DESCRIPTION OF THE DRAWINGS

The components in the drawings are not necessarily to scale relative to each other and like reference numerals designate corresponding parts throughout the several views.

DETAILED DESCRIPTION OF THE INVENTION

To make the advantages of the technical solutions of the present disclosure clearer and more understandable, the technical solutions of the present disclosure are described in details below in conjunction with specific embodiments.

LoRa implements low-rate wireless transmission, but implementation of high-rate wireless transmission (e.g., video data) can be realized by various modes. The specific embodiments of the present disclosure merely take a Wi-Fi wireless transmission mode for example. As a replaceable mode, the Wi-Fi wireless transmission mode in the following specific embodiments completely can be replaced with a COFDM wireless transmission mode.

Figure 1:
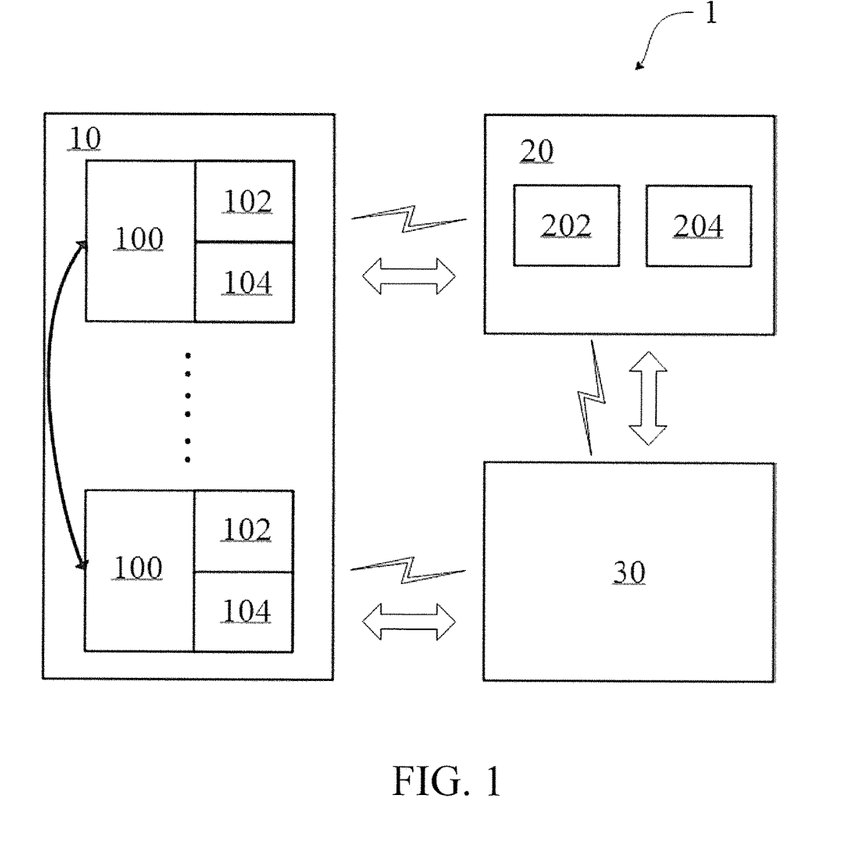
FIG. 1 illustrates an exemplary diagram of a system for fire ground entry control based on internet of things in accordance with an embodiment of the disclosure.

Firstly, the present disclosure provides a system 1 for fire ground entry control based on internet of things. The system for fire ground entry control based on internet of things mainly includes the following three subsystems:

a fire ground entry Node subsystem 10;

a fire ground entry LoRa Gateway&Server subsystem 20; and a monitoring and controlling subsystem 30.

Figure 2:
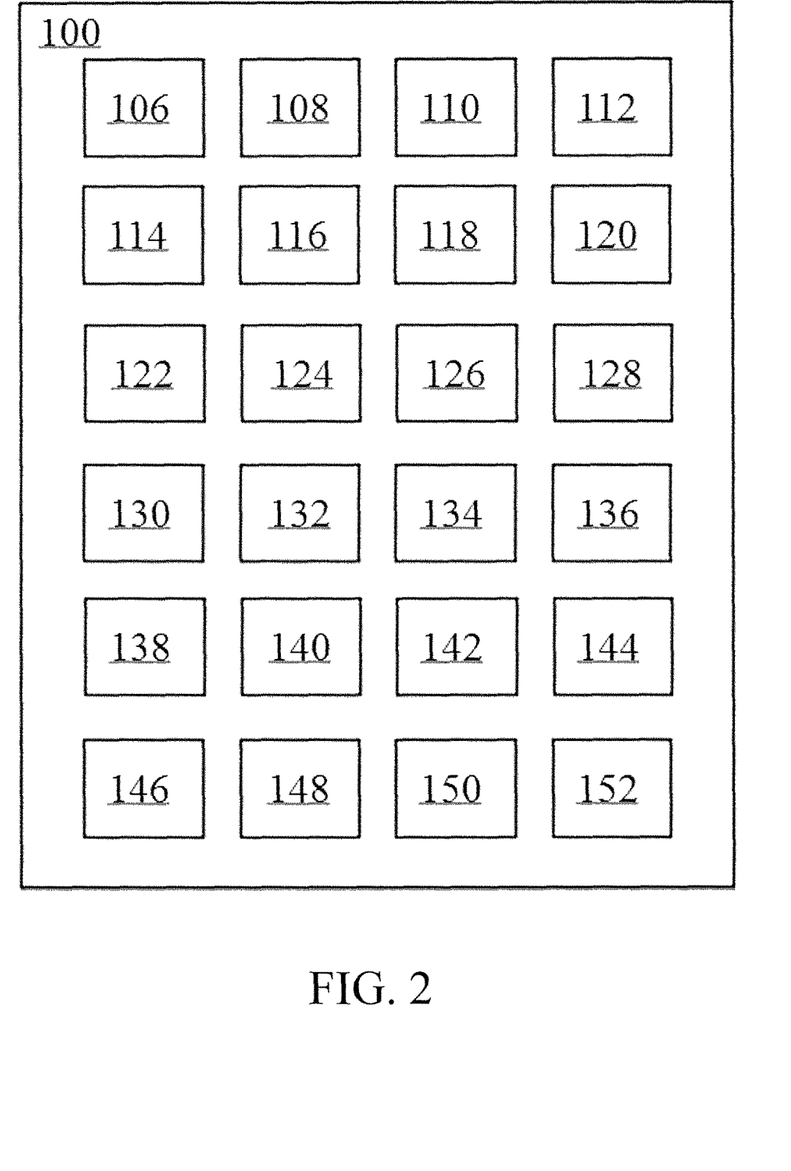
FIG. 2 illustrates an exemplary diagram of a LoRa Node terminal in accordance with an embodiment of the disclosure.

The fire ground entry Node subsystem includes multiple LoRa Node terminals, each user entering a fire ground is equipped with a LoRa Node terminal 100, and each LoRa Node terminal includes a LoRa antenna 102 and a Wi-Fi antenna 104;

the fire ground entry LoRa Gateway&Server subsystem includes a LoRa Gateway chip 202 and a LoRa Server chip 204, both of which are integrated into a whole body, a LoRa antenna, a Wi-Fi antenna and a battery pack;

the monitoring and controlling subsystem 30 is used for monitoring the fire ground entry Node subsystem and the fire ground entry LoRa Gateway&Server subsystem 20;

the LoRa Node terminals are connected through LoRa;

each LoRa Node terminal 100 of the fire ground entry Node subsystem 10 is wirelessly connected with the fire ground entry LoRa Gateway&Server subsystem 20 through a LoRaWAN network;

each LoRa Node terminal 100 of the fire ground entry Node subsystem 10 is wirelessly connected with the monitoring and controlling subsystem 30 through Wi-Fi and/or COFDM; and the fire ground entry LoRa Gateway&Server subsystem 20 is wirelessly connected with the monitoring and controlling subsystem 30 through the Wi-Fi and/or the COFDM.

Optionally, the LoRa Node terminal includes the following functional modules:

a video collection module 106, including an infrared camera and a visible-light camera;

a fire ground environment detection module 108, including a temperature sensor, a humidity sensor, an air pressure sensor, an air component sensor and a wind speed sensor;

where the air component sensor can monitor concentrations of petroleum gas, methane, carbon monoxide and carbon dioxide;

a vital sign detection module 110, including a shell temperature sensor, a heart rate sensor, a blood pressure sensor and a respiration sensor;

an A/D conversion module 112, used for converting analogue signals collected by each sensor in the fire ground environment detection module and the vital sign detection module into digital signals;

a navigation and location module 114, including an inertial navigation and location unit and a satellite navigation and location unit; where the satellite navigation and location unit includes a GPS location subunit and a Beidou location subunit; the satellite navigation and location unit is used for performing navigation and location when a satellite navigation and location signal is relatively stronger; and the inertial navigation and location unit is used for performing the navigation and location when the satellite navigation and location signal is relatively weaker or does not exist;

a wireless communication module 116, including the LoRa antenna and the Wi-Fi antenna;

an electronic map receiving module 118, used for, before a user enters the fire ground, downloading a fire ground building electronic map from the fire ground entry LoRa Gateway&Server subsystem through a LoRaWAN network or downloading the fire ground building electronic map from the monitoring and controlling subsystem through a Wi-Fi network;

a preset route generation module 120, used for generating multiple preset fire ground entry routes according to the downloaded fire ground building electronic map, and recommending an optimal preset route to the user;

a preset route deviation prompting module 122, used for prompting that a current position of the user is deviated from the preset route when the current position of the user is deviated from the preset route;

an escape route calculation module 124, used for recalculating a route for the user according to the fire ground building electronic map and the current position of the user when the current position of the user is deviated from the preset route;

a barrier prompting module 126, used for reading an actual position of the user in real time, and generating a voice prompt for prompting the user about a barrier when the user is close to the barrier in the fire ground building electronic map, where the barrier includes a step, a bend, a stair, a cross beam, an upright, a door, a door frame, a doorsill, a ground bulge, a pit and a hole;

an air cylinder connection module 128, used for connecting a high-pressure air pipe port of the LoRa Node terminal with an air pipe of a respirator air cylinder, where such connection is fixed by a bolt;

a power-on module 130, used for powering on the LoRa Node terminal when one of the following conditions is met:
 i) when the LoRa Node terminal is powered off, the user long presses a power button over 3 seconds; and
 ii) when the LoRa Node terminal is powered off, a lasting time of an output pressure larger than 1 MPa of an air cylinder is over 3 seconds after a high-pressure valve of the air cylinder is switched on;

a power-off module 132, used for powering off the LoRa Node terminal when the LoRa Node terminal is powered on, a displayed pressure value of a pressure gage is smaller than 1 MPa and the user long presses the power button over 3 seconds;

a terminal screen switching module 134, used for switching a terminal screen between the following two interfaces when the user presses a screen switching button:
 a) an interface only displaying an air cylinder pressure; and
 b) an interface simultaneously displaying the air cylinder pressure, an air cylinder residual respiration time and an environment temperature;

an air cylinder pressure display module 136, used for displaying an internal pressure value of the air cylinder in real time;

an air cylinder pressure alarming module 138, used for simultaneously generating an audible alarm and a visual alarm when the air cylinder pressure exceeds a safety range, where the audible alarm is implemented by buzz of a buzzer, and the visual alarm is implemented by flashing of an indicating lamp, the volume of the buzzer is larger than or equal to 90 dB, and the air cylinder pressure is in the safety range if and only if the internal pressure value of the air cylinder is larger than or equal to 1 MPa and smaller than or equal to 6 MPa;

an air cylinder residual air amount and usable time display module 140, used for dynamically displaying a residual air amount of the air cylinder and a residual usable time of the air cylinder in real time;

a battery low voltage alarming module 142, used for enabling a battery low voltage indicating lamp to turn yellow and be always on in order to give a battery low voltage alarm prompt when a residual battery capacity of the LoRa Node terminal is smaller than a first battery capacity threshold, where the first battery capacity threshold is in an amount of 20% of the total battery capacity;

a fall-down alarm call module 144, used for performing an automatic pre-alarm and/or alarm call after the user is in distress and falls down;

an active distress call module 146, used for performing an active distress call when the user is in distress, where the active distress call module is enabled when the user continuously presses a distress call button over 3 seconds, and the active distress call module is disabled when the user continuously presses the distress calling button over 2 seconds under the condition that the active distress call module is on;

a fire ground environment parameter real-time display module 148, used for displaying a temperature, humidity, an air pressure, air components, and/or a wind speed of the fire ground environment in real time;

a vital sign parameter real-time display module 150, used for displaying a shell temperature, a heart rate, a blood pressure, and/or respiration parameters of a user entering the fire ground in real time; and an indicating lamp module 152, including a group of indicating lamps with difference colors, and used for indicating different states of the LoRa Node terminal, where the group of indicating lamps include:
 a LoRa Node terminal and LoRa Gateway&Server subsystem connection indicating lamp, blue;

a LoRa Node terminal and monitoring and controlling subsystem connection indicating lamp, green;
a battery low voltage indicating lamp, yellow;
a temperature indicating lamp, red;
an air component indicating lamp, pink;
an air cylinder and respiratory abnormality indicating lamp, orange;
a vital sign abnormality indicating lamp, purple;
a preset route deviation indicating lamp, gray; and
an alarm indicating lamp, white.

The following specifically describes hardware implementation and performance parameters of the LoRa Node terminal in the fire ground entry Node subsystem and the fire ground entry LoRa Gateway&Server subsystem.

Fire Ground Entry Node Subsystem 10

Wireless technologies in applications of the internet of things, except for 2G/3G/4G of a communication network, include the local area network and various short range communication technologies, such as Wi-Fi within a 2.4 G frequency band, Bluetooth, Zigbee, Sub-Ghz and the like. Such short range communication technologies have very obvious advantages and disadvantages. The wireless application development and engineering operation-maintenance persons always have such a dilemma that the designers can only choose one from longer range or lower power. However, after the LoRa technology is utilized, the designers can take into account both of the longer range and the lower power, and they can implement the both to the utmost extent and additionally save relay costs at the same time.

Hardware implementation and performance parameters of the LoRa Node terminal in the fire ground entry Node subsystem are as follows:
LoRaWAN Module with a built-in STM32L051C8T6 CPU;
complete implementation of a LoRaWAN 1.0 protocol stack;
onboard STM32L051C8T6 CPU;
support of LoRaWAN Class A, Class C;
use of TCXO;
168 db as a dynamic range of RSSI;
9.9 mA as low RX current, and 200 nA register holding;
FSK, GFSK, MSK, GMSK, LoRa™ and OOK modulations;
frequency range: 433/470/490/780/868/915 MHz;
output power: +20 dBm (100 mW);
power supply: 2.4 to 3.6 V;
sensitivity: −147 dBm;
range: larger than 1.8 km; and
working temperature range: 40 DEG C. below zero to 85 DEG C.

Fire Ground Entry LoRa Gateway&Server Subsystem 20

Hardware implementation and performance parameters of the fire ground entry LoRa Gateway&Server subsystem are as follows:
capability of simultaneously receiving the same channel flow;
eight channels, each of which can simultaneously receive and transmit multiple data;
extensibility to increase network capacity;
capability of simultaneously demodulating a 2 MHz bandwidth;
simple star network without delay and loss;
adaptive link rate;
index of 100,000 nodes to be simultaneously communicated;
backhaul access mode: LAN, Wi-Fi;
transmission power: 27 dBm (adjustable);
link sensitivity: −157 dBm;
range: 1.5 km;
supported frequency: 433/868 MHz;
power supply: POE; and
working temperature range: 40 DEG C. below zero to 85 DEG C.

Additionally, the present disclosure further provides a method for fire ground entry control based on internet of things. The method is applied to the system for fire ground entry control based on internet of things, each user entering a fire ground is provided with a LoRa Node terminal, and the following steps are sequentially performed before the user enters the fire ground:

a1) the user checks whether the terminal is powered on; and the terminal can be powered on by utilizing one of the following two modes if the terminal is not powered on:
  i) a power button is long pressed over 3 seconds; and
  ii) a high-pressure valve of an air cylinder is switched on, and the terminal is automatically powered on when a lasting time of an output pressure larger than 1 MPa of the air cylinder is over 3 seconds;

a2) whether a LoRa network of the terminal is in normal connection is detected; and a LoRa network connection abnormality prompt is transmitted to the monitoring and controlling subsystem if the LoRa network of the terminal is not in normal connection;

a3) whether a Wi-Fi network of the terminal is in normal connection is detected; and a Wi-Fi network connection abnormality prompt is transmitted to the fire ground entry LoRa Gateway&Server subsystem if the Wi-Fi network of the terminal is not in normal connection;

a4) whether a high-pressure air pipe port of the terminal is normally connected with an air pipe of a respirator air cylinder is detected; and the user is prompted to fix a bolt if the high-pressure air pipe port of the LoRa Node terminal is not normally connected with the air pipe of the respirator air cylinder;

a5) whether the air cylinder needs to be changed is detected; and specifically, the air cylinder needs to be changed when one of the following conditions is met:
  i) an air cylinder pressure is out of a safety range;
  ii) an internal residual air amount of the air cylinder is smaller than a preset value; and
  iii) a residual usable time of the air cylinder is smaller than a preset value;

a6) whether a battery voltage of the terminal is lower than a second battery voltage threshold is detected; and the user is prompted to charge or change a battery if the battery voltage of the terminal is lower than the second battery voltage threshold, where the second battery voltage threshold is in an amount of 30% of a total capacity of the battery;

a7) whether each indicating lamp in the indicating lamp module normally works is detected; and an indicating lamp module initialization abnormality prompt is transmitted to the monitoring and controlling subsystem if each indicating lamp in the indicating lamp module does not normally work;

a8) whether each sensor in the fire ground environment detection module normally works is detected; and a fire ground environment detection module initialization abnormality prompt is transmitted to the monitoring and controlling subsystem if each sensor in the fire ground environment detection module does not normally work;

a9) whether each camera in the video collection module normally works is detected; and a video collection module initialization abnormality prompt is transmitted to the monitoring and controlling subsystem if each camera in the video collection module does not normally work;

a10) whether each sensor in the vital sign detection module normally works is detected; and a vital sign detection module initialization abnormality prompt is transmitted to the monitoring and controlling subsystem if each sensor in the vital sign detection module does not normally work;

a11) whether each navigation and location unit in the navigation and location module normally works is detected; and a navigation and location module initialization abnormality prompt is transmitted to the monitoring and controlling subsystem if each navigation and location unit in the navigation and location module does not normally work;

a12) whether the fire ground entry LoRa Gateway&Server subsystem saves a fire ground building electronic map is judged; and the fire ground building electronic map is downloaded through the monitoring and controlling subsystem if the fire ground entry LoRa Gateway&Server subsystem does not save the fire ground building electronic map, and then the fire ground building electronic map is uploaded to the fire ground entry LoRa Gateway&Server subsystem;

a13) whether a transmission rate of a LoRaWAN network between the LoRa Node terminal of the user and the fire ground entry LoRa Gateway&Server subsystem reaches a preset value is judged;

the LoRa Node terminal of the user downloads the fire ground building electronic map from the fire ground entry LoRa Gateway&Server subsystem through the LoRaWAN network if the transmission rate of the LoRaWAN network between the LoRa Node terminal of the user and the fire ground entry LoRa Gateway&Server subsystem reaches the preset value; and the LoRa Node terminal of the user downloads the fire ground building electronic map from the monitoring and controlling subsystem through the Wi-Fi network if the transmission rate of the LoRaWAN network between the LoRa Node terminal of the user and the fire ground entry LoRa Gateway&Server subsystem does not reach the preset value; and a14) multiple preset fire ground entry routes are generated according to the downloaded fire ground building electronic map, and an optimal preset route is recommended to the user.

Optionally, the following operations are performed in real time after the user enters the fire ground:

b1) the fact that a current position of the user is deviated from a preset route is prompted if detecting that an actual position of the user is deviated from the preset route; and a route is recalculated for the user according to the fire ground building electronic map and the current position of the user;

b2) a voice prompt is given to the user to pay attention to a barrier if detecting that the user is close to the barrier in the fire ground building electronic map, where the barrier includes a step, a bend, a stair, a cross beam, an upright, a door, a door frame, a doorsill, a ground bulge, a pit and a hole;

b3) a pre-alarm state is activated if detecting that the user falls down and a still time of the user is over a maximum still time threshold, and at this point, a "beep" pre-alarm call is continuously emitted;

whether user movement is detected in a pre-alarm time threshold is judged after the pre-alarm state is activated;

the pre-alarm is automatically canceled and the pre-alarm call is stopped if the user movement is detected in the pre-alarm time threshold; and an alarm state is switched from the pre-alarm state if the user movement is not detected in the pre-alarm time threshold, and at this point, a "beep" alarm call is continuously emitted, where the frequency and decibel of the alarm call are higher than the frequency and decibel of the pre-alarm call;

b4) the user is instructed through the indicating lamp module specifically as follows:

a blue indicating lamp is turned on if detecting that the LoRa Node terminal is not normally connected with the fire ground entry LoRa Gateway&Server subsystem;

a green indicating lamp is turned on if detecting that the LoRa Node terminal is not normally connected with the monitoring and controlling subsystem;

a yellow indicating lamp is turned on if detecting that the residual battery capacity of the terminal is lower than a first battery capacity threshold;

a red indicating lamp is turned on if detecting that a fire ground environment temperature is over a preset value;

a pink indicating lamp is turned on if detecting that a content of each gas in air components of the fire ground is over a preset value;

an orange indicating lamp is turned on and blinks if detecting that the air cylinder is not correctly connected or an air cylinder pressure is out of the safety range;

a purple indicating lamp is turned on if detecting that vital sign parameters are abnormal;

a gray indicating lamp is turned on if detecting that the user is deviated from the preset route; and a white indicating lamp is turned on if detecting that the user falls down;

b5) fire ground video data collected by the video collection module of the terminal is stored into a video data buffer of the terminal; and the following operations are performed at every constant time interval or when the video data buffer is full:

b5-1) the fire ground video data stored in the video data buffer is encoded;
    b5-2) the encoded fire ground video data is uploaded to the monitoring and controlling subsystem;
    b5-3) the encoded fire ground video data is forwarded to a database of the fire ground entry LoRa Gateway&Server subsystem by the monitoring and controlling subsystem; and
    b5-4) the video data buffer is deleted; and the following operations are performed when the fire ground entry LoRa Gateway&Server subsystem receives the fire ground video data of the terminal:

b5-1), the received fire ground video data is decoded;
    b5-2), feature extraction is performed on the decoded fire ground video data, thereby obtaining feature data; and
    b5-3), whether the fire ground building electronic map needs to be updated is judged according to the obtained feature data; and the updated fire ground building electronic map is transmitted to the terminal and the monitoring and controlling subsystem if the fire ground building electronic map needs to be updated; and b6) analogue signals collected by each sensor in the fire ground environment detection module and the vital sign detection module are converted into digital signals; and the indicating lamp module is triggered according to requirements based on the obtained digital signals.

The above-mentioned embodiments are only used for illustrating the present disclosure, and are not intended to limit the present disclosure. Although the present disclosure has been described in details with reference to the embodiments, it should be understood that modifications and equivalent replacements made by a person skilled in the art without departing from the scope and essence of the present disclosure shall all fall within the scope defined by the claims of the present disclosure.

What is claimed is:

1. A system for fire ground entry control based on internet of things, comprising:
  a fire ground entry Node subsystem comprising multiple LoRa Node terminals, each user entering a fire ground is equipped with a LoRa Node terminal, and each LoRa Node terminal comprises a LoRa antenna and a Wi-Fi antenna;
  a fire ground entry LoRa Gateway&Server subsystem comprising a LoRa Gateway chip, a LoRa Server chip, a LoRa antenna, a Wi-Fi antenna and a battery pack, and the LoRa Gateway chip and the LoRa Server chip are integrated into a whole body; and
  a monitoring and controlling subsystem used for monitoring the fire ground entry Node subsystem and the fire ground entry LoRa Gateway&Server subsystem,
  wherein the LoRa Node terminals are connected to each other through LoRa, each LoRa Node terminal in the fire ground entry Node subsystem is wirelessly connected with the fire ground entry LoRa Gateway&Server subsystem through a LoRaWAN network, each LoRa Node terminal in the fire ground entry Node subsystem is wirelessly connected with the monitoring and controlling subsystem through Wi-Fi and/or COFDM, and the fire ground entry LoRa Gateway&Server subsystem is wirelessly connected with the monitoring and controlling subsystem through Wi-Fi and/or COFDM,
  wherein the LoRa Node terminal comprises:
    a navigation and location module, comprising an inertial navigation and location unit and a satellite navigation and location unit;
    a wireless communication module, comprising the LoRa antenna and the Wi-Fi antenna;
    an electronic map receiving module, used for, before a user enters the fire ground, downloading a fire ground building electronic map from the fire ground entry LoRa Gateway&Server subsystem through a LoRaWAN network or downloading the fire ground building electronic map from the monitoring and controlling subsystem through a Wi-Fi network;
    a preset route generation module, used for generating multiple preset fire ground entry routes according to the downloaded fire ground building electronic map, and recommending an optimal preset route to the user;
    a preset route deviation prompting module, used for prompting that a current position of the user is deviated from the preset route when the current position of the user is deviated from the preset route;
    an escape route calculation module, used for recalculating a route for the user according to the fire ground building electronic map and the current position of the user when the current position of the user is deviated from the preset route; and
    a barrier prompting module, used for reading an actual position of the user in real time, and generating a voice prompt for prompting the user about a barrier when the user is close to the barrier in the fire ground building electronic map.

2. The system according to claim 1, wherein the satellite navigation and location unit is used for performing navigation and location when a satellite navigation and location signal is relatively stronger, and the inertial navigation and location unit is used for performing the navigation and location when the satellite navigation and location signal is relatively weaker or does not exist.

3. The system according to claim 1, wherein the satellite navigation and location unit comprises a GPS location subunit and a Beidou location subunit.

4. The system according to claim 1, wherein the barrier comprises a step, a bend, a stair, a cross beam, an upright, a door, a door frame, a doorsill, a ground bulge, a pit and a hole.

5. The system according to claim 1, wherein the LoRa Node terminal further comprises:
  a video collection module, comprising an infrared camera and a visible-light camera;
  a fire ground environment detection module, comprising a temperature sensor, a humidity sensor, an air pressure sensor, an air component sensor and a wind speed sensor, wherein the air component sensor can monitor concentrations of petroleum gas, methane, carbon monoxide and carbon dioxide;
  a vital sign detection module, comprising a shell temperature sensor, a heart rate sensor, a blood pressure sensor and a respiration sensor.

6. The system according to claim 5, wherein the LoRa Node terminal further comprises an A/D conversion module, used for converting analogue signals collected by each sensor in the fire ground environment detection module and the vital sign detection module into digital signals.

7. The system according to claim 1, wherein the LoRa Node terminal further comprises:
  an air cylinder connection module, used for connecting a high-pressure air pipe port of the LoRa Node terminal with an air pipe of a respirator air cylinder, wherein such connection is fixed by a bolt;
  an air cylinder pressure display module, used for displaying an internal pressure value of the air cylinder in real time;
  an air cylinder pressure alarming module, used for simultaneously generating an audible alarm and a visual alarm when the air cylinder pressure exceeds a safety range; and
  an air cylinder residual air amount and usable time display module, used for dynamically displaying a residual air amount of the air cylinder and a residual usable time of the air cylinder in real time.

8. The system according to claim 7, wherein the audible alarm is implemented by buzz of a buzzer, and the visual alarm is implemented by flashing of an indicating lamp, and the volume of the buzzer is larger than or equal to 90 dB.

9. The system according to claim 7, wherein the air cylinder pressure is in the safety range if the internal pressure value of the air cylinder is larger than or equal to 1 MPa and smaller than or equal to 6 MPa.

10. The system according to claim 1, wherein the LoRa Node terminal further comprises:
  a power-on module, used for powering on the LoRa Node terminal when one of the following conditions is met:
    i) when the LoRa Node terminal is powered off, the user long presses a power button over 3 seconds; and
    ii) when the LoRa Node terminal is powered off, a lasting time of an output pressure larger than 1 MPa of an air cylinder is over 3 seconds after a high-pressure valve of the air cylinder is switched on; and
  a power-off module, used for powering off the LoRa Node terminal when the LoRa Node terminal is powered on, a displayed pressure value of a pressure gage is smaller than 1 MPa and the user long presses the power button over 3 seconds.

11. The system according to claim 1, wherein the LoRa Node terminal further comprises: a terminal screen switching module, used for switching a terminal screen between the following two interfaces when the user presses a screen switching button:
a) an interface only displaying an air cylinder pressure; and
b) an interface simultaneously displaying the air cylinder pressure, an air cylinder residual respiration time and an environment temperature.

12. The system according to claim 1, wherein the LoRa Node terminal further comprises:
a battery low voltage alarming module, used for enabling a battery low voltage indicating lamp to turn yellow and be always on in order to give a battery low voltage alarm prompt when a residual battery capacity of the LoRa Node terminal is smaller than a first battery capacity threshold;
a fall-down alarm call module, used for performing an automatic pre-alarm and/or alarm call after the user is in distress and falls down; and
an active distress call module, used for performing an active distress call when the user is in distress.

13. The system according to claim 12, wherein the first battery capacity threshold is in an amount of 20% of the total battery capacity.

14. The system according to claim 12, wherein the active distress call module is enabled when the user continuously presses a distress call button over 3 seconds, and the active distress call module is disabled when the user continuously presses the distress calling button over 2 seconds under the condition that the active distress call module is enabled.

15. The system according to claim 1, wherein the LoRa Node terminal further comprises:
a fire ground environment parameter real-time display module, used for displaying a temperature, humidity, an air pressure, air components, and/or a wind speed of the fire ground environment in real time; and
a vital sign parameter real-time display module, used for displaying a shell temperature, a heart rate, a blood pressure, and/or respiration parameters of a user entering the fire ground in real time.

16. The system according to claim 1, wherein the LoRa Node terminal further comprises: an indicating lamp module, comprising a group of indicating lamps with difference colors, and used for indicating different states of the LoRa Node terminal.

17. The system according to claim 16, wherein the group of indicating lamps comprise:
a LoRa Node terminal and LoRa Gateway&Server subsystem connection indicating lamp, blue;
a LoRa Node terminal and monitoring and controlling subsystem connection indicating lamp, green;
a battery low voltage indicating lamp, yellow;
a temperature indicating lamp, red;
an air component indicating lamp, pink;
an air cylinder and respiratory abnormality indicating lamp, orange;
a vital sign abnormality indicating lamp, purple;
a preset route deviation indicating lamp, gray; and
an alarm indicating lamp, white.

18. A system for fire ground entry control based on internet of things, comprising:
a fire ground entry Node subsystem comprising multiple LoRa Node terminals, each user entering a fire ground is equipped with a LoRa Node terminal, and each LoRa Node terminal comprises a LoRa antenna and a Wi-Fi antenna;
a fire ground entry LoRa Gateway&Server subsystem comprising a LoRa Gateway chip, a LoRa Server chip, a LoRa antenna, a Wi-Fi antenna and a battery pack, and the LoRa Gateway chip and the LoRa Server chip are integrated into a whole body; and
a monitoring and controlling subsystem used for monitoring the fire ground entry Node subsystem and the fire ground entry LoRa Gateway&Server subsystem,
wherein the LoRa Node terminals are connected through LoRa, each LoRa Node terminal in the fire ground entry Node subsystem is wirelessly connected with the fire ground entry LoRa Gateway&Server subsystem through a LoRaWAN network, each LoRa Node terminal in the fire ground entry Node subsystem is wirelessly connected with the monitoring and controlling subsystem through Wi-Fi and/or COFDM, and the fire ground entry LoRa Gateway&Server subsystem is wirelessly connected with the monitoring and controlling subsystem through Wi-Fi and/or COFDM; wherein the LoRa Node terminal comprises the following functional modules:
a video collection module, comprising an infrared camera and a visible-light camera;
a fire ground environment detection module, comprising a temperature sensor, a humidity sensor, an air pressure sensor, an air component sensor and a wind speed sensor, wherein the air component sensor can monitor concentrations of petroleum gas, methane, carbon monoxide and carbon dioxide;
a vital sign detection module, comprising a shell temperature sensor, a heart rate sensor, a blood pressure sensor and a respiration sensor;
an A/D conversion module, used for converting analogue signals collected by each sensor in the fire ground environment detection module and the vital sign detection module into digital signals;
a navigation and location module, comprising an inertial navigation and location unit and a satellite navigation and location unit, wherein the satellite navigation and location unit comprises a GPS location subunit and a Beidou location subunit, the satellite navigation and location unit is used for performing navigation and location when a satellite navigation and location signal is relatively stronger, and the inertial navigation and location unit is used for performing the navigation and location when the satellite navigation and location signal is relatively weaker or does not exist;
a wireless communication module, comprising the LoRa antenna and the Wi-Fi antenna;
an electronic map receiving module, used for, before a user enters the fire ground, downloading a fire ground building electronic map from the fire ground entry LoRa Gateway&Server subsystem through a LoRaWAN network or downloading the fire ground building electronic map from the monitoring and controlling subsystem through a Wi-Fi network;
a preset route generation module, used for generating multiple preset fire ground entry routes according to the downloaded fire ground building electronic map, and recommending an optimal preset route to the user;
a preset route deviation prompting module, used for prompting that a current position of the user is deviated from the preset route when the current position of the user is deviated from the preset route;

an escape route calculation module, used for recalculating a route for the user according to the fire ground building electronic map and the current position of the user when the current position of the user is deviated from the preset route;

a barrier prompting module, used for reading an actual position of the user in real time, and generating a voice prompt for prompting the user about a barrier when the user is close to the barrier in the fire ground building electronic map, wherein the barrier comprises a step, a bend, a stair, a cross beam, an upright, a door, a door frame, a doorsill, a ground bulge, a pit and a hole;

an air cylinder connection module, used for connecting a high-pressure air pipe port of the LoRa Node terminal with an air pipe of a respirator air cylinder, wherein such connection is fixed by a bolt;

a power-on module, used for powering on the LoRa Node terminal when one of the following conditions is met:
  i) when the LoRa Node terminal is powered off, the user long presses a power button over 3 seconds; and
  ii) when the LoRa Node terminal is powered off, a lasting time of an output pressure larger than 1 MPa of an air cylinder is over 3 seconds after a high-pressure valve of the air cylinder is switched on;

a power-off module, used for powering off the LoRa Node terminal when the LoRa Node terminal is powered on, a displayed pressure value of a pressure gage is smaller than 1 MPa and the user long presses the power button over 3 seconds;

a terminal screen switching module, used for switching a terminal screen between the following two interfaces when the user presses a screen switching button:
  a) an interface only displaying an air cylinder pressure; and
  b) an interface simultaneously displaying the air cylinder pressure, an air cylinder residual respiration time and an environment temperature;

an air cylinder pressure display module, used for displaying an internal pressure value of the air cylinder in real time;

an air cylinder pressure alarming module, used for simultaneously generating an audible alarm and a visual alarm when the air cylinder pressure exceeds a safety range, wherein the audible alarm is implemented by buzz of a buzzer, and the visual alarm is implemented by flashing of an indicating lamp, the volume of the buzzer is larger than or equal to 90 dB, and the air cylinder pressure is in the safety range if and only if the internal pressure value of the air cylinder is larger than or equal to 1 MPa and smaller than or equal to 6 MPa;

an air cylinder residual air amount and usable time display module, used for dynamically displaying a residual air amount of the air cylinder and a residual usable time of the air cylinder in real time;

a battery low voltage alarming module, used for enabling a battery low voltage indicating lamp to turn yellow and be always on in order to give a battery low voltage alarm prompt when a residual battery capacity of the LoRa Node terminal is smaller than a first battery capacity threshold, wherein the first battery capacity threshold is in an amount of 20% of the total battery capacity;

a fall-down alarm call module, used for performing an automatic pre-alarm and/or alarm call after the user is in distress and falls down;

an active distress call module, used for performing an active distress call when the user is in distress, wherein the active distress call module is enabled when the user continuously presses a distress call button over 3 seconds, and the active distress call module is disabled when the user continuously presses the distress calling button over 2 seconds under the condition that the active distress call module is enabled;

a fire ground environment parameter real-time display module, used for displaying a temperature, humidity, an air pressure, air components, and/or a wind speed of the fire ground environment in real time;

a vital sign parameter real-time display module, used for displaying a shell temperature, a heart rate, a blood pressure, and/or respiration parameters of a user entering the fire ground in real time; and an indicating lamp module, comprising a group of indicating lamps with difference colors, and used for indicating different states of the LoRa Node terminal, wherein the group of indicating lamps comprise:
  a LoRa Node terminal and LoRa Gateway&Server subsystem connection indicating lamp, blue;
  a LoRa Node terminal and monitoring and controlling subsystem connection indicating lamp, green;
  a battery low voltage indicating lamp, yellow;
  a temperature indicating lamp, red;
  an air component indicating lamp, pink;
  an air cylinder and respiratory abnormality indicating lamp, orange;
  a vital sign abnormality indicating lamp, purple;
  a preset route deviation indicating lamp, gray; and
  an alarm indicating lamp, white.

19. A method for fire ground entry control based on internet of things applied to a system for fire ground entry control based on internet of things, wherein the system for fire ground entry control based on internet of things comprises:

a fire ground entry Node subsystem comprising multiple LoRa Node terminals, each user entering a fire ground is equipped with a LoRa Node terminal, and each LoRa Node terminal comprises a LoRa antenna and a Wi-Fi antenna;

a fire ground entry LoRa Gateway&Server subsystem comprising a LoRa Gateway chip, a LoRa Server chip, a LoRa antenna, a Wi-Fi antenna and a battery pack, and the LoRa Gateway chip and the LoRa Server chip are integrated into a whole body; and a monitoring and controlling subsystem used for monitoring the fire ground entry Node subsystem and the fire ground entry LoRa Gateway&Server subsystem, wherein the LoRa Node terminals are connected through LoRa, each LoRa Node terminal in the fire ground entry Node subsystem is wirelessly connected with the fire ground entry LoRa Gateway&Server subsystem through a LoRaWAN network, each LoRa Node terminal in the fire ground entry Node subsystem is wirelessly connected with the monitoring and controlling subsystem through Wi-Fi and/or COFDM, and the fire ground entry LoRa Gateway&Server subsystem is wirelessly connected with the monitoring and controlling subsystem through Wi-Fi and/or COFDM, wherein the LoRa Node terminal comprises the following functional modules:

a video collection module, comprising an infrared camera and a visible-light camera;

a fire ground environment detection module, comprising a temperature sensor, a humidity sensor, an air pressure sensor, an air component sensor and a wind speed sensor, wherein the air component sensor can monitor concentrations of petroleum gas, methane, carbon monoxide and carbon dioxide;

a vital sign detection module, comprising a shell temperature sensor, a heart rate sensor, a blood pressure sensor and a respiration sensor;

an A/D conversion module, used for converting analogue signals collected by each sensor in the fire ground environment detection module and the vital sign detection module into digital signals;

a navigation and location module, comprising an inertial navigation and location unit and a satellite navigation and location unit, wherein the satellite navigation and location unit comprises a GPS location subunit and a Beidou location subunit, the satellite navigation and location unit is used for performing navigation and location when a satellite navigation and location signal is relatively stronger, and the inertial navigation and location unit is used for performing the navigation and location when the satellite navigation and location signal is relatively weaker or does not exist;

a wireless communication module, comprising the LoRa antenna and the Wi-Fi antenna;

an electronic map receiving module, used for, before a user enters the fire ground, downloading a fire ground building electronic map from the fire ground entry LoRa Gateway&Server subsystem through a LoRaWAN network or downloading the fire ground building electronic map from the monitoring and controlling subsystem through a Wi-Fi network;

a preset route generation module, used for generating multiple preset fire ground entry routes according to the downloaded fire ground building electronic map, and recommending an optimal preset route to the user;

a preset route deviation prompting module, used for prompting that a current position of the user is deviated from the preset route when the current position of the user is deviated from the preset route;

an escape route calculation module, used for recalculating a route for the user according to the fire ground building electronic map and the current position of the user when the current position of the user is deviated from the preset route;

a barrier prompting module, used for reading an actual position of the user in real time, and generating a voice prompt for prompting the user about a barrier when the user is close to the barrier in the fire ground building electronic map, wherein the barrier comprises a step, a bend, a stair, a cross beam, an upright, a door, a door frame, a doorsill, a ground bulge, a pit and a hole;

an air cylinder connection module, used for connecting a high-pressure air pipe port of the LoRa Node terminal with an air pipe of a respirator air cylinder, wherein such connection is fixed by a bolt;

a power-on module, used for powering on the LoRa Node terminal when one of the following conditions is met:
  i) when the LoRa Node terminal is powered off, the user long presses a power button over 3 seconds; and
  ii) when the LoRa Node terminal is powered off, a lasting time of an output pressure larger than 1 MPa of an air cylinder is over 3 seconds after a high-pressure valve of the air cylinder is switched on;

a power-off module, used for powering off the LoRa Node terminal when the LoRa Node terminal is powered on, a displayed pressure value of a pressure gage is smaller than 1 MPa and the user long presses the power button over 3 seconds;

a terminal screen switching module, used for switching a terminal screen between the following two interfaces when the user presses a screen switching button:
  a) an interface only displaying an air cylinder pressure; and
  b) an interface simultaneously displaying the air cylinder pressure, an air cylinder residual respiration time and an environment temperature;

an air cylinder pressure display module, used for displaying an internal pressure value of the air cylinder in real time;

an air cylinder pressure alarming module, used for simultaneously generating an audible alarm and a visual alarm when the air cylinder pressure exceeds a safety range, wherein the audible alarm is implemented by buzz of a buzzer, and the visual alarm is implemented by flashing of an indicating lamp, the volume of the buzzer is larger than or equal to 90 dB, and the air cylinder pressure is in the safety range if and only if the internal pressure value of the air cylinder is larger than or equal to 1 MPa and smaller than or equal to 6 MPa;

an air cylinder residual air amount and usable time display module, used for dynamically displaying a residual air amount of the air cylinder and a residual usable time of the air cylinder in real time;

a battery low voltage alarming module, used for enabling a battery low voltage indicating lamp to turn yellow and be always on in order to give a battery low voltage alarm prompt when a residual battery capacity of the LoRa Node terminal is smaller than a first battery capacity threshold, wherein the first battery capacity threshold is in an amount of 20% of the total battery capacity;

a fall-down alarm call module, used for performing an automatic pre-alarm and/or alarm call after the user is in distress and falls down;

an active distress call module, used for performing an active distress call when the user is in distress, wherein the active distress call module is enabled when the user continuously presses a distress call button over 3 seconds, and the active distress call module is disabled when the user continuously presses the distress calling button over 2 seconds under the condition that the active distress call module is enabled;

a fire ground environment parameter real-time display module, used for displaying a temperature, humidity, an air pressure, air components, and/or a wind speed of the fire ground environment in real time;

a vital sign parameter real-time display module, used for displaying a shell temperature, a heart rate, a blood pressure, and/or respiration parameters of a user entering the fire ground in real time; and an indicating lamp module, comprising a group of indicating lamps with difference colors, and used for indicating different states of the LoRa Node terminal, wherein the group of indicating lamps comprise:
  a LoRa Node terminal and LoRa Gateway&Server subsystem connection indicating lamp, blue;
  a LoRa Node terminal and monitoring and controlling subsystem connection indicating lamp, green;
  a battery low voltage indicating lamp, yellow;
  a temperature indicating lamp, red;
  an air component indicating lamp, pink;
  an air cylinder and respiratory abnormality indicating lamp, orange;
  a vital sign abnormality indicating lamp, purple;
  a preset route deviation indicating lamp, gray; and an alarm indicating lamp, white, wherein the method for fire ground entry control based on internet of things sequentially comprises the following steps before the user enters the fire ground:
a1) by the user, checking whether the terminal is powered on; and powering on the terminal by utilizing one of the following two modes if the terminal is not powered on:
  i) long pressing a power button over 3 seconds; and
  ii) switching on the high-pressure valve of an air cylinder, and automatically powering on the terminal when a lasting time of an output pressure larger than 1 MPa of the air cylinder is over 3 seconds;
a2) detecting whether a LoRa network of the terminal is in normal connection;
and transmitting a LoRa network connection abnormality prompt to the monitoring and controlling subsystem if the LoRa network of the terminal is not in normal connection;
a3) detecting whether a Wi-Fi network of the terminal is in normal connection; and transmitting a Wi-Fi network connection abnormality prompt to a fire ground entry LoRa Gateway&Server subsystem if the Wi-Fi network of the terminal is not in normal connection;
a4) detecting whether a high-pressure air pipe port of the terminal is normally connected with an air pipe of a respirator air cylinder; and prompting the user to greatly fix a bolt if the high-pressure air pipe port of the terminal is not normally connected with the air pipe of the respirator air cylinder;
a5) detecting whether the air cylinder needs to be changed; and specifically, changing the air cylinder when one of the following conditions is met:
  i) an air cylinder pressure is out of a safety range;
  ii) an internal residual air amount of the air cylinder is smaller than a preset value; and
  iii) a residual usable time of the air cylinder is smaller than a preset value;
a6) detecting whether a battery voltage of the terminal is lower than a second battery voltage threshold; and prompting the user to charge or change a battery if the battery voltage of the terminal is lower than the second battery voltage threshold, wherein the second battery voltage threshold is in an amount of 30% of a total capacity of the battery;
a7) detecting whether each indicating lamp in the indicating lamp module normally works; and transmitting an indicating lamp module initialization abnormality prompt to the monitoring and controlling subsystem if each indicating lamp in the indicating lamp module does not normally work;
a8) detecting whether each sensor in the fire ground environment detection module normally works; and transmitting a fire ground environment detection module initialization abnormality prompt to the monitoring and controlling subsystem if each sensor in the fire ground environment detection module does not normally work;
a9) detecting whether each camera in the video collection module normally works; and transmitting a video collection module initialization abnormality prompt to the monitoring and controlling subsystem if each camera in the video collection module does not normally work;
a10) detecting whether each sensor in the vital sign detection module normally works; and transmitting a vital sign detection module initialization abnormality prompt to the monitoring and controlling subsystem if each sensor in the vital sign detection module does not normally work;
a11) detecting whether each navigation and location unit in the navigation and location module normally works; and transmitting a navigation and location module initialization abnormality prompt to the monitoring and controlling subsystem if each navigation and location unit in the navigation and location module does not normally work;
a12) judging whether the fire ground entry LoRa Gateway&Server subsystem saves a fire ground building electronic map; and
downloading the fire ground building electronic map through the monitoring and controlling subsystem if the fire ground entry LoRa Gateway&Server subsystem does not save the fire ground building electronic map, and then uploading the fire ground building electronic map to the fire ground entry LoRa Gateway&Server subsystem;
a13) judging whether a transmission rate of a LoRaWAN network between the LoRa Node terminal of the user and the fire ground entry LoRa Gateway&Server subsystem reaches a preset value;
downloading the fire ground building electronic map from the fire ground entry LoRa Gateway&Server subsystem through the LoRaWAN network by the LoRa Node terminal of the user if the transmission rate of the LoRaWAN network between the LoRa Node terminal of the user and the fire ground entry LoRa Gateway&Server subsystem reaches the preset value; and
downloading the fire ground building electronic map from the monitoring and controlling subsystem through the Wi-Fi network by the LoRa Node terminal of the user if the transmission rate of the LoRaWAN network between the LoRa Node terminal of the user and the fire ground entry LoRa Gateway&Server subsystem does not reach the preset value; and
a14) generating multiple preset fire ground entry routes according to the downloaded fire ground building electronic map, and recommending an optimal preset route to the user.

20. The method according to claim 19, wherein the following operations are performed in real time after the user enters the fire ground:
b1) prompting that a current position of the user is deviated from a preset route if detecting that an actual position of the user is deviated from the preset route; and recalculating a route for the user according to the fire ground building electronic map and the current position of the user;
b2) giving a voice prompt to the user to pay attention to a barrier if detecting that the user is close to the barrier in the fire ground building electronic map, wherein the barrier comprises a step, a bend, a stair, a cross beam, an upright, a door, a door frame, a doorsill, a ground bulge, a pit and a hole;
b3) activating a pre-alarm state if detecting that the user falls down and a still time of the user is over a maximum still time threshold, and at this point, continuously emitting a "beep" pre-alarm call;
judging whether user movement is detected in a pre-alarm time threshold after the pre-alarm state is activated;
automatically canceling the pre-alarm and stopping the pre-alarm call if the user movement is detected in the pre-alarm time threshold; and switching to an alarm state from the pre-alarm state if the user movement is not detected in the pre-alarm time threshold, and at this point, continuously emitting a "beep" alarm call, wherein the frequency and decibel of the alarm call are higher than the frequency and decibel of the pre-alarm call;

b4) instructing the user through the indicating lamp module specifically as follows:
- turning on a blue indicating lamp if detecting that the LoRa Node terminal is not normally connected with the fire ground entry LoRa Gateway&Server subsystem;
- turning on a green indicating lamp if detecting that the LoRa Node terminal is not normally connected with the monitoring and controlling subsystem;
- turning on a yellow indicating lamp if detecting that the residual battery capacity of the terminal is lower than a first battery capacity threshold;
- turning on a red indicating lamp if detecting that a fire ground environment temperature is over a preset value;
- turning on a pink indicating lamp if detecting that a content of each gas in air components of the fire ground is over a preset value;
- turning on an orange indicating lamp and making the lamp blink if detecting that the air cylinder is not correctly connected or an air cylinder pressure is out of the safety range;
- turning on a purple indicating lamp if detecting that vital sign parameters are abnormal;
- turning on a gray indicating lamp if detecting that the user is deviated from the preset route; and
- turning on a white indicating lamp if detecting that the user falls down;

b5) storing fire ground video data collected by the video collection module of the terminal into a video data buffer of the terminal; performing the following operations at every constant time interval or when the video data buffer is full:
- b5-1) encoding the fire ground video data stored in the video data buffer;
- b5-2) uploading the encoded fire ground video data to the monitoring and controlling subsystem;
- b5-3) forwarding the encoded fire ground video data to a database of the fire ground entry LoRa Gateway&Server subsystem by the monitoring and controlling subsystem; and
- b5-4) deleting the video data buffer;

performing the following operations when the fire ground entry LoRa Gateway&Server subsystem receives the fire ground video data of the terminal:
- b5-1') decoding the received fire ground video data;
- b5-2') performing feature extraction on the decoded fire ground video data, thereby obtaining feature data; and
- b5-3') judging whether the fire ground building electronic map needs to be updated according to the obtained feature data; and transmitting the updated fire ground building electronic map to the terminal and the monitoring and controlling subsystem if the fire ground building electronic map needs to be updated; and b6) converting analogue signals collected by each sensor in the fire ground environment detection module and the vital sign detection module into digital signals; and triggering the indicating lamp module according to requirements based on the obtained digital signals.

* * * * *